July 12, 1927.  1,635,314
L. A. DOIGNON
CENTRIFUGAL REGULATOR
Filed Aug. 29, 1925    2 Sheets-Sheet 1
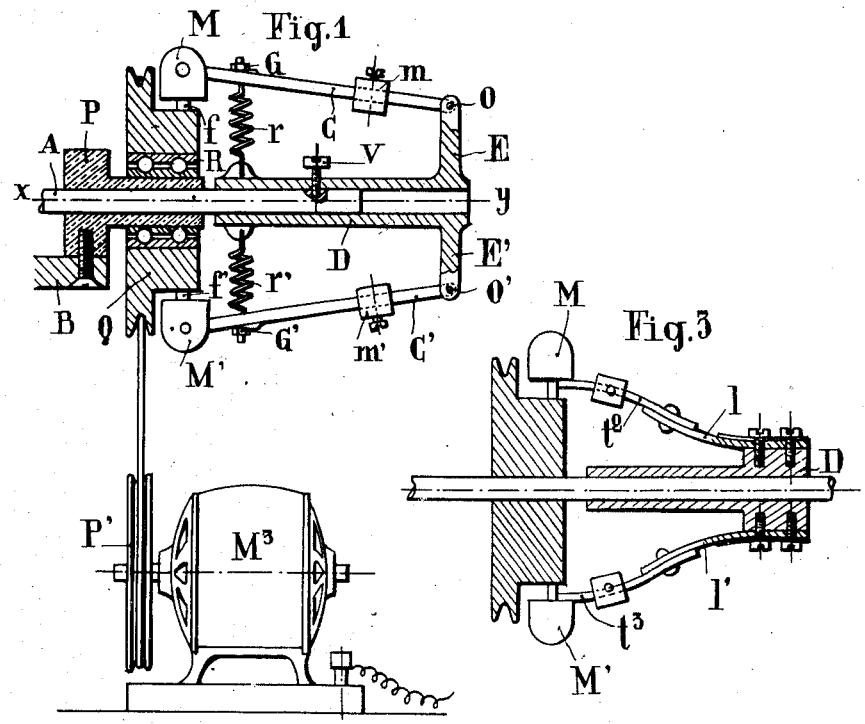
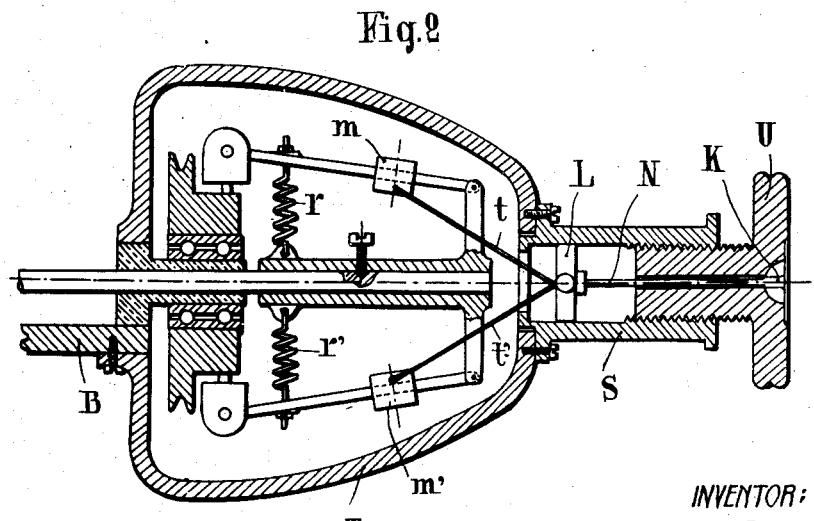
INVENTOR:
Louis Abel Doignon
BY
ATTORNEY Patented July 12, 1927.

1,635,314

UNITED STATES PATENT OFFICE.

LOUIS ABEL DOIGNON, OF MALAKOFF, FRANCE.

CENTRIFUGAL REGULATOR.

Application filed August 29, 1925, Serial No. 53,366, and in France September 6, 1924.

The present invention has for its object to provide an improved regulator which will maintain constant the speed of a driven shaft; such regulator comprising a set of bodies which are adjustable as to position and tension and which are provided with pads or rubbers, these bodies being attached to levers pivoted to a part or member secured to the driven shaft.

The function of the aforesaid bodies is (1) to frictionally engage a pulley loose on the driven shaft and actuated by the motor so long as the speed of that shaft is lower than the desired constant speed; and (2) to slip on the loose pulley when the speed of the latter becomes higher than the desired speed, the phenomenon of slipping resulting in keeping the speed of rotation of the said bodies—that is to say, the speed of the regulator—absolutely constant as long as the speed of the loose pulley exceeds the aforesaid desired speed.

In order to enable the invention to be clearly understood, several embodiments thereof have been illustrated in the accompanying drawing, of which:

Figure 1 is a vertical sectional view of one embodiment;

Figs. 2 and 3 are sectional views of two modifications;

Throughout the several views the same or corresponding parts are designated by the same reference characters.

Figure 4:
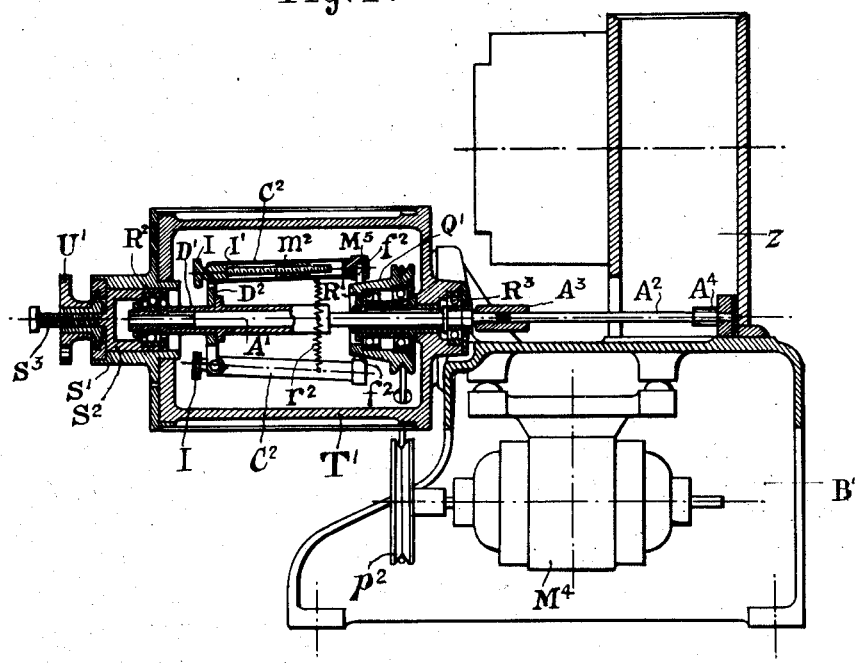
Fig. 4 is a sectional view of a further and preferred embodiment, designed to permit the speed of the apparatus to be gradually and very substantially changed during operation.

Referring to Fig. 1, A indicates the shaft which is to be driven at a strictly constant speed, and P is one of its bearings mounted on the frame B of the apparatus. A ball-bearing R has a tight frictional fit on a cylindrical shoulder or hub formed on the bearing P, and a grooved pulley Q is loosely mounted on said hub and is likewise provided at one side with a hub or shoulder, the arrangement being such that the axes of the two hubs and of the pulley exactly coincide with the axis X—Y of shaft A. A suitable motor M³ carries a driving pulley P′ on its shaft which is belted to pulley Q, so as to transmit thereto the rotation of the driving pulley.

The driven shaft A projects some distance beyond pulley Q, and on this projecting portion there is secured, by means of a screw V or otherwise, a sleeve D which terminates at its outer end in a pair of cross-arms E, E′, said sleeve constituting a part or member of the improved regulator. The arms E. E′ are formed with terminal forks O, O′ wherein are pivoted the ends of a pair of arms or levers C, C′ which carry terminal weights or bodies M, M′ and auxiliary sliding weights $m$, $m'$; the latter being held in adjusted position by set-screws or other fastening devices. The main or terminal weights M, M′ are provided with rubbers or pads $f$, $f'$ of fiber, leather, wood or other suitable material adapted to engage the circumferential wall or surface of the hub of pulley Q, toward which they are yieldingly drawn by the action of springs $r$, $r'$ connected at opposite ends to arms C, C′ and to ears or lugs on sleeve D; said springs being adjustable in point of tension by means of nuts G, G′.

The operation of the construction above described is substantially as follows: When the motor M³ is started, the rubbers $f$, $f'$ first of all stay in contact with the hub of the loose pulley Q, without slipping thereon, and the speed of the regulator increases with that of the motor up to a certain point, when the following phenomenon takes place:

At a certain speed of the regulator, which is the standard speed of the apparatus to be driven, the rubbers no longer frictionally grip the hub of the loose pulley but slip thereon, so that no matter how high the speed of the pulley becomes, the peripheral speed of the rubbers and, hence, that of the regulator stays absolutely the same. If the speed of the loose pulley increases, there is a greater slipping of the rubbers; but if the speed decreases, then the slipping lessens; and if the speed of the pulley becomes equal to or less than the standard speed mentioned above, then slipping no longer occurs and the speed of the regulator diminishes at the same time as that of the pulley. Briefly, then, the regulator acts as a speed-limiting device.

The arrangement should be such that even when the motor is operating at its poorest the speed of the loose pulley will still be higher than the standard speed beyond which slipping takes place. In such conditions, regardless of the speed of the motor, the speed of the regulator and, consequently, that of the mechanism to be regulated will remain constant and equal to the standard speed.

The improved regulator has been primarily designed for use in connection with the so-called Hughes and Baudot telegraph instruments, but is capable of application generally to all apparatus or instruments which require a regular or constant rotary speed. In the case of a Baudot distributor, it is mounted on the shaft of the flywheel in place of the usual Baudot regulator. The motor $M^3$ to which the driving pulley $P'$ is attached may operate with either direct or alternating current of any voltage; but the arrangement should be such that the speed of pulley $P'$ will at least equal the standard speed of the regulator when the speed of the motor drops from 30 to 40%. Perfect regulation of the distributor is thus obtained through direct drive with any conventional motor even when supplied with current by the poorest sort of mains.

If it is desired to vary the speed slightly during operation, this can be done in two ways, the first of which is as follows:

There is attached to the above-described regulator, as shown in Fig. 2, an adjusting device which is connected with the sliding weights $m$, $m'$ to enable them to be shifted in either direction along their supporting arms or levers C, C'. Such device may comprise a pair of diverging rods $t$, $t'$ connected at one end to the aforesaid weights, and at the other end to a block L which is rotatably fitted in a tubular extension or sleeve S rigidly fastened to a casing T that encloses the regulator and is itself attached to the frame B. The block L has connected to it the inner end of a rod N which is loosely fitted in the axially-bored stem of a knob U and which terminates at its outer end in a shoulder K that fits in a recess in said knob. The stem of the latter is threaded in sleeve S, so that by turning it in either direction an endwise movement will be imparted to it, which can be transmitted to rod N and thence to head L and rods $t$, $t'$, with the result that the position of the weights $m$, $m'$ is correspondingly changed. Hence, the speed of the regulator can be varied at will within certain limits without requiring stoppage of the apparatus.

In the case of a Hughes instrument, the improved regulator, equipped with the weight-adjusting device just described, can be attached to the end of the shaft of the movable body in place of the regulator brake.

If desired the spiral springs $r$, $r'$ can be replaced by leaf springs $l$, $l'$ (Fig. 3) which are secured to sleeve D, these leaf springs having attached to them rods $t^2$, $t^3$ which carry both the main weights and the sliding auxiliary weights; the latter being shiftable by an adjusting device similar to that represented in Fig. 2.

The second arrangement for varying the speed during running is illustrated in Fig. 4, which shows the loose pulley $Q'$ belted to the driving pulley $P^2$ carried by the shaft of the motor $M^4$, the latter being mounted in the base or pedestal $B'$ of the apparatus Z. In this construction, the loose pulley $Q'$, which is supported on ball-bearings $R'$, is conical in form and is provided with a tempered or hardened surface, dressed perfectly smooth, whereon rest the rubbers $f^2$ carried by the weights $M^e$ on the adjacent ends of the regulator arms or levers $C^2$. These arms are here shown as of tubular formation and as pivotally connected to the ends of a cross-piece $D^2$ that constitutes part of the sleeve $D'$, which latter is keyed to the driven shaft $A'$ for sliding movement thereon and is supported at one end in the ball-bearing $R^2$. The tubular arms $C^2$ have spiral springs $r^2$ connected to them to pull the rubbers toward the conical surface of pulley $Q'$.

The auxiliary or adjustable weights are designated $m^2$ in this form and, as shown, are slidably fitted in the tubular arms $C^2$, wherein they are mounted on threaded rods $I'$ which can be turned in either direction by knobs I in order to shift the position of the weights. The speed-changing operation is here effected by moving bodily as a unit the sleeve $D'$, its cross-piece $D^2$, the two hollow arms $C^2$ and their rubbers $f^2$, whereby the last-named parts are shifted relatively to the cone pulley $Q'$ with which they coact. Accordingly, the casing $T'$ of the regulator is provided at its outer end with a tubular extension or sleeve $S'$ wherein is slidably fitted an inner sleeve $S^2$ which encloses and has connected to it the ball-bearing $R^2$ that is associated with the sleeve $D'$ so that the endwise movement of the said inner sleeve $S^2$ will thus be transmitted to sleeve $D'$. This movement of sleeve $S^2$ is obtained by providing it with a threaded stem $S^3$ which projects outwardly through the threaded bore of an operating knob $U'$ and is engaged with the same. The knob $U'$ is connected with the fixed sleeve $S'$ on casing $T'$ and, therefore, the rotary movement of said knob will produce the desired endwise movement of sleeve $S^2$ and the consequent adjustment of the rubbers $f^2$ with relation to pulley $Q'$.

At the inner end of the casing $T'$ a fixed ball-bearing $R^3$ is located through which the corresponding end of the driven shaft $A'$ extends, said shaft being coupled at this point by a sleeve $A^3$ to a second shaft $A^2$ in axial alinement with it. This shaft $A^2$ is toothed at its other end and supported by a suitable bearing; its toothed portion $A^4$ being designed to mesh with the last pinion of the apparatus or instrument Z to be regulated which, in the present instance, is assumed to be the distributor of a Baudot transmitter mounted on frame B'.

The operation is substantially as follows: The motor having been started, its motion is transmitted to the cone pulley Q', which is engaged at a certain part thereof by the rubbers $f^2$, and a certain angular speed is thus obtained for shaft A'. When knob U' is turned in the proper direction to effect a movement of sleeve $S^2$ to the right, the ball-bearing $R^2$ will be forced in the same direction and, in turn, will shift the regulator unit bodily rightward on shaft A'. This movement of the regulator unit will cause the rubbers $f^2$ to be shifted toward the larger end of pulley Q', whereby the arms $C^2$ will be spread further apart and the springs $r^2$ will be subjected to greater tension. The rubbers will thus be held more tightly against the cone pulley and the regulator will rotate as a unit at a higher speed. On the other hand, rotation of knob U' in a direction to move the regulator unit leftward, will bring the rubbers toward the smaller end of the cone pulley, and the speed of the regulator will proportionately decrease. The initial adjustment of the speed of the regulator is effected while the latter is at rest by setting the springs $r^2$ at the desired tension and positioning the movable weights $m^2$.

The modified construction just described, as well as the preceding ones, are primarily designed for application to a Baudot instrument, as previously stated; but they can also be applied to a Hughes instrument by connecting shaft A' with the fly wheel shaft either by means of a coupling sleeve or, if the regulator is arranged vertically, by means of bevel gearing.

I claim as my invention:—

1. The combination, with a shaft to be constantly driven at a predetermined speed, a pulley loosely mounted thereon, and a driving device connected with the pulley, of a centrifugal regulator for maintaining such speed, said regulator embodying: a sleeve mounted on said shaft to rotate in unsion therewith, a set of swinging arms pivotally connected at one end with the sleeve and provided at the other end with fixed weights having rubbers attached thereto for frictional engagement with the loose pulley, springs connected to said arms to move them inward toward said sleeve so as to press the rubbers against the said pulley, and manually-operated means for varying the pressure of the rubbers against the pulley while the regulator is rotating and thereby changing its speed.

2. The combination, with a shaft to be constantly driven at a predetermined speed, a pulley loosely mounted thereon, and a driving device connected with the pulley, of a centrifugal regulator for maintaining such speed, said regulator embodying: a sleeve mounted on said shaft to rotate in unison therewith, a set of swinging arms pivotally connected at one end with the sleeve and provided at the other end with fixed weights having rubbers attached thereto for frictional engagement with the loose pulley, springs connected to said arms to move them inward toward said sleeve so as to press the rubbers against the said pulley, weights slidably related to said arms to vary the pressure of the rubbers against the pulley, and manually operated means for shifting the slidable weights.

3. A centrifugal regulator, according to claim 2, in which the swinging arms are hollow, and the sliding weights are disposed therein.

4. A centrifugal regulator, according to claim 2, in which the swinging arms are hollow and receive threaded axial rods therein on which the sliding weights are mounted.

5. The combination, with a shaft to be constantly driven at a predetermined speed, a cone pulley loosely mounted thereon, and a driving device connected with the pulley, of a centrifugal regulator on said shaft to rotate the same while maintaining such speed; said regulator embodying a sleeve fitted on said shaft and having a threaded stem, a set of swinging arms connected with said sleeve and provided with weights having rubbers attached to them for frictional engagement with said pulley, and springs for pulling said arms inward toward the shaft so as to press the rubbers against the pulley; and a rotatable knob engaged with said stem to move the same and the sleeve and thereby shift the regulator bodily as a unit in either direction axially of said shaft to engage the rubbers with different portions of the cone pulley and thereby change the speed of the shaft.

In testimony whereof I affix my signature.

LOUIS ABEL DOIGNON.